United States Patent [19]

McCrory et al.

[11] 3,940,020
[45] Feb. 24, 1976

[54] LEAK DETECTION SYSTEM AND METHOD

[75] Inventors: Rollin John McCrory; George Dennis Robinson, Jr., both of Greensboro, N.C.

[73] Assignee: Gilbert & Baker Manufacturing Company, Greensboro, N.C.

[22] Filed: Aug. 23, 1973

[21] Appl. No.: 390,786

[52] U.S. Cl................................ 222/52; 73/40.5 R
[51] Int. Cl.².................... B67D 5/14; G01M 3/08
[58] Field of Search................. 73/40, 40.5 R, 49.1; 222/52

[56] References Cited
UNITED STATES PATENTS

| | | | |
|---|---|---|---|
| 2,952,389 | 9/1960 | Fowler et al........................ | 222/52 |
| 3,183,723 | 5/1965 | Deters............................... | 73/40.5 R |
| 3,273,753 | 9/1966 | Johnson et al..................... | 222/52 |
| 3,454,195 | 8/1969 | Deters............................... | 222/52 |

*Primary Examiner*—Drayton E. Hoffman
*Assistant Examiner*—Hadd Lane
*Attorney, Agent, or Firm*—Finnegan, Henderson, Farabow & Garrett

[57] ABSTRACT

A leak detection system and method of detecting leaks are disclosed for detecting leaks in a dispensing system having a pump, dispenser, conduit connecting the pump and dispenser and a valve to isolate the pump from the dispenser when a fluid is not being dispensed. The leak detection system includes a leak detector including an enclosure in fluid flow communication with the portion of the conduit downstream from the valve, a member responsive to the fluid condition within the enclosure and signal means responsive to the fluid condition responsive member for indicating the existence of a predetermined fluid condition.

A valve seating means which is pressure activated to forceably seat the valve also is provided.

A leak detecting method is disclosed which includes the steps of activating the pump, opening the dispenser and dispensing a fluid, closing the dispenser, closing the valve to isolate the pump from the dispenser, sensing a flow of fluid in the conduit portion between the valve and dispenser, and energizing signal means if the fluid flow is greater than a predetermined amount.

26 Claims, 6 Drawing Figures

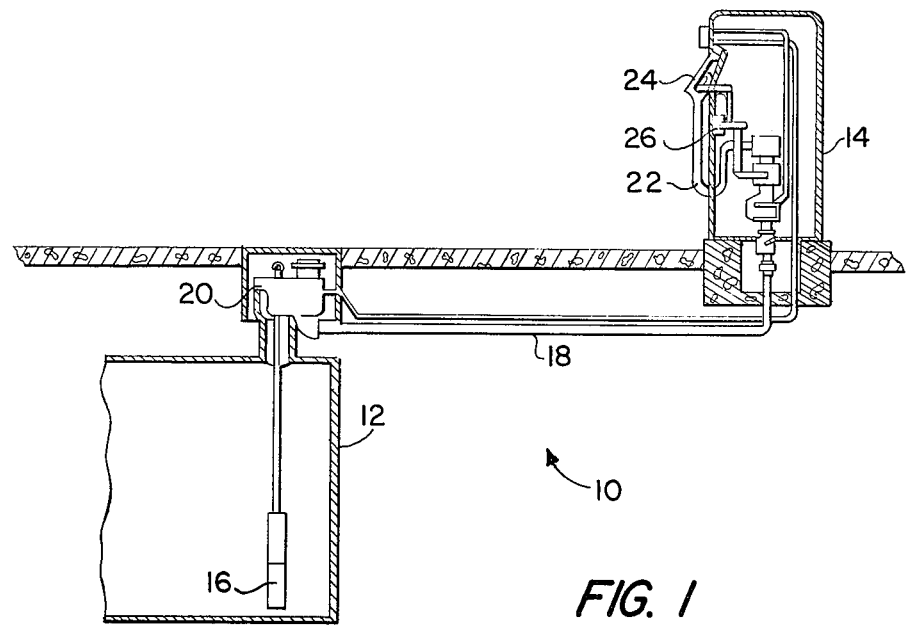

FIG. 1

| FLUID DISPENSED | DISPENSING TERMINATED |
|---|---|
| POWER SWITCH CLOSED | DISPENSER NOZZLE VALVE CLOSED |
| ↓ | ↓ |
| PUMP SWITCH CLOSED | CHECK VALVE CLOSED |
| ↓ | ↓ |
| PUMP ON | PUMP SWITCH OPENED |
| ↓ | ↓ |
| DISPENSER NOZZLE VALVE OPEN | CONTROL VALVE OPEN |
| ↓ | ↓ |
| CHECK VALVE OPEN | CHECK VALVE CLAMPED SHUT |
| ↓ | ↓ |
| FLUID DISPENSED | LEAK DETECTION STARTS |

LEAK
ALARM ON
PUMP STOPS CAN'T START UNTIL MANUALLY RESET

NO LEAK
PUMP STOPS
CONTROL VALVE CLOSES
CHECK VALVE CLAMP-DOWN RELEASED

FIG. 5

LEAK DETECTION SYSTEM AND METHOD

BACKGROUND

This invention relates to improved leak detection systems and, more particularly, to a leak detection system used with a fluid dispenser and pump and to a method for detecting leaks.

One particular application for the system and method of this invention is to detect leaks in a fluid delivery line through which fluid is intermittently delivered under pressure. For example, remote pumping systems are being used more frequently in gasoline service stations. Typically, a pump and motor unit is submerged in an underground tank and is used to supply gasoline to a plurality of dispensers. These systems conventionally include a pump, a dispenser, a conduit connecting the two, and a valve, such as a check valve, in the conduit isolating the pump from the dispenser when a fluid is not being dispensed. The fluid in the discharge line portion of the conduit between the check valve and the dispenser is under pressure during dispensing and between dispensing operations. When these remote pumping systems are used for the dispensing of gasoline, it is important to determine whether or not there is a leak in the conduit since continued undetected leakage over prolonged periods may result in a dangerous accumulation of gasoline in the ground. A leakage rate in excess of 3.5–4.0 gallons per day is considered intolerable and should be detected.

In order to determine whether or not a leak exists in the conduit, it is desirable that the valves at the ends of the conduit seal tight. If the valve at the dispenser end is defective, it will be readily observable since the fluid, such as gasoline, will be seen dripping from the dispenser nozzle. However, since the check valve is not readily observable, precautions should be taken to be sure that the check valve is properly seated to prevent flow of the fluid from the discharge line back through the check valve toward the pump. If such flow exists, it would render the leakage test inaccurate.

Accordingly, it is an objective of this invention to provide an improved leak detection system and method for detecting leaks in a delivery line portion of a conduit between a valve and a fluid dispenser.

BRIEF DESCRIPTION OF THE LEAK DETECTION SYSTEM

To achieve the foregoing objective and in accordance with the purpose of this invention, as embodied and broadly described herein, the leak detection system of this invention comprises valve seating means including a chamber having a pressure responsive member mounted therein and means operated by the pressure responsive member adapted to forceably seat the valve in response to a predetermined pressure condition in the chamber. The system further includes a leak detector comprising an enclosure in fluid flow communication with the portion of the conduit between the valve and the dispenser and a member responsive to the fluid condition within the enclosure which, in turn, is a function of the fluid condition in the portion of the conduit between the valve and the dispenser, and signal means responsive to the fluid condition responsive member to indicate when a predetermined fluid condition in that portion of the conduit exists.

The invention also comprises a method of detecting leaks in a system having a fluid pump, a dispenser, a conduit connecting the pump and dispenser and a valve in the conduit, the method including the steps of activating the pump and opening the dispenser to dispense the fluid, closing the dispenser, closing the valve to isolate the pump from the dispenser, applying fluid pressure on the valve to insure the closure thereof, sensing a flow of fluid in the portion of the conduit between the valve and the dispenser, and energizing signal means if the flow of fluid in that portion is greater than a predetermined amount.

The above objective and the advantages of this invention will be set forth in part in the description which follows, and in part will be obvious from the description, or may be learned by practice of the invention. The objectives and advantages of this invention may be realized and obtained by means of the instrumentalities and combinations particularly pointed out in the appended claims.

The invention consists in the novel parts, constructions, arrangements, combinations and improvements shown and described. The principles of this invention are explained in the detailed description below taken together with the accompanying drawings which are incorporated in and constitute a part of this specification and in which:

FIG. 1 is a schematic illustration of a gasoline dispensing system of the type with which the leak detection system of this invention can be used.

FIG. 5 is a flow diagram illustrating the leak detecting method employed with the system of FIG. 3.

DETAILED DESCRIPTION

Figure 2:
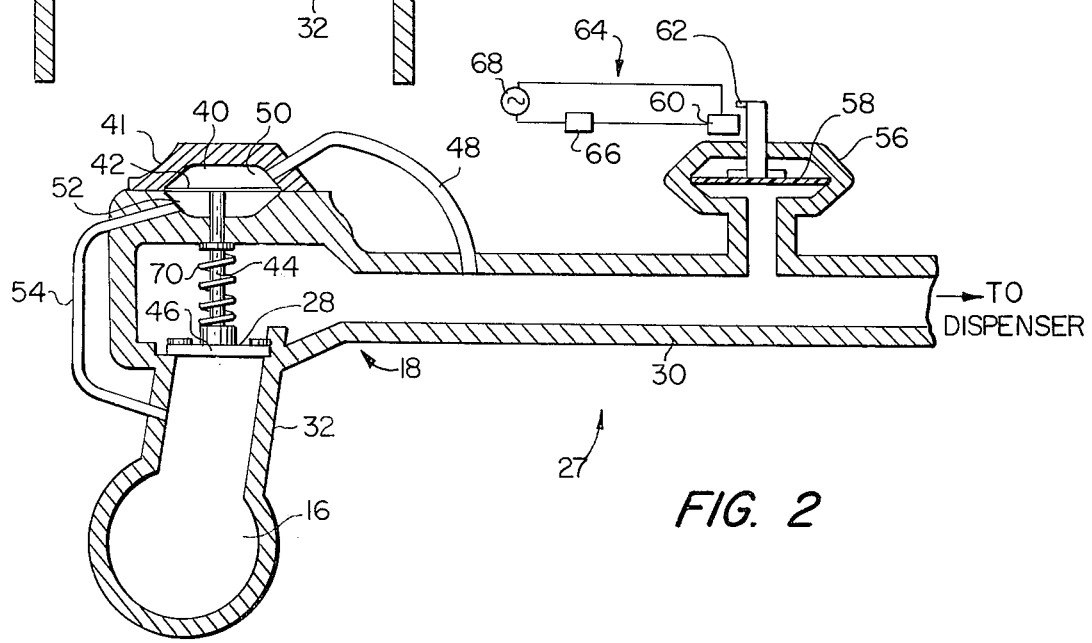
FIG. 2 is a schematic sectional view of a leak detection system formed in accordance with one embodiment of this invention.

First Embodiment (FIGS. 1 and 2)

Reference will now be made in detail to the present preferred embodiments of the invention, examples of which are illustrated in the accompanying drawings.

While there exists many possible applications for the leak detection system of this invention, one such application is a dispensing system 10 of the type used in gasoline service stations such as is illustrated in FIG. 1. Such a dispensing system typically includes a vented underground gasoline storage tank 12 which is used to supply gasoline to a plurality of dispensers 14, only one of which is shown. A submersible pump, such as pump 16, is located in the storage tank 12 for pumping gasoline from the tank 12 through appropriate delivery lines or conduits 18 which run underground to the dispensers 14. While the outlet of the pump 16 may be connected directly to the delivery lines 18, it is conventional to use as part of the conduit system a discharge head 20 to facilitate installation, servicing and replacement of the pump. The discharge head 20 is provided with a line check valve to control flow back toward the pump 16.

The dispensers 14 are each provided with a delivery hose 22 and a manually operable dispenser nozzle valve 24 at its outlet end through which the gasoline is dispensed. A pump control switch 26 is normally provided on the dispenser 14 which is manually closed to start the pump immediately before the gasoline is to be dispensed. The dispensers and their method of operation are conventional and well known and do not form a part of this invention; therefore, it is believed there is no need to describe their structure and operation in further detail. The dispenser is used in this specification as illustrative of the environment in which the leak detection system of this invention can be used and it is believed that description of the dispenser and its operation will help in the understanding of this invention.

With reference now to FIG. 2 there is illustrated a leak detection system, generally 27, for use in a fluid dispensing system having a fluid pump 16, a conduit 18 connecting the pump 16 with a dispenser 14 and a valve, such as check valve 28, located in the conduit 18 between the pump 16 and the dispenser 14 to isolate the pump from the dispenser when a fluid is not being dispensed.

The conduit 18 can be considered as having two portions, namely, a first portion 30 between the valve 28 and the dispenser 14, and a second portion 32 between the valve 28 and the pump 16.

In accordance with the invention, clampdown or seating of the valve 28 is facilitated by valve seating means. As here embodied, there is provided a chamber 40 having a pressure responsive first member 42 mounted therein. Preferably, the pressure responsive member 42 is a flexible resilient diaphragm. For reasons described below, the diaphragm will be directly exposed to the fluid being dispensed and, therefore, the diaphragm material must be compatible with the fluid. For a gasoline dispensing system a synthetic fiber such as nylon mesh bonded together by a gasoline resistive synthetic rubber compound such as Viton A has been found to be a suitable material.

The valve seating means also includes means operated by the pressure responsive member which is adapted to forceably seat the valve in response to a predetermined pressure condition within the chamber 40. As here embodied a simple and inexpensive construction includes a rod 44 attached at one end to the diaphragm 42 and at its other end to a valve head 46.

The chamber 40 is divided into two sections by the diaphragm 42. By means of a tube or other suitable duct 48, a first section 50 of the chamber is placed in fluid flow communication with the first portion 30 of the conduit 18 and a second section 52 of the chamber is placed in fluid flow communication with the second portion 32 of the conduit 18 by means of a second tube 54.

Further in accordance with this invention a leak detector is placed in fluid flow communication with the first portion 30 of the conduit 18. One form of leak detector is employed in the first embodiment shown in FIG. 2 and includes an enclosure such as an accumulator 56 schematically shown in FIG. 2. The accumulator 56 may be located at any convenient location within the system provided it is in fluid flow communication with the first portion 30 of the conduit 18. The accumulator 56 is provided with a member which is responsive to the fluid condition within the accumulator. The member also is capable of exerting a predetermined pressure on the fluid in the first portion 30 of the conduit 18. One form of such member is a weighted diaphragm 58 mounted across the accumulator 56 and adapted to be in contact with the fluid within the accumulator and to exert a predetermined pressure upon the fluid. For use in a conventional gasoline dispensing system, a pressure of approximately 30 lbs. per square inch was found to be suitable.

While one specific pressure exerting means is shown in FIG. 2 and described herein, it should be noted that other means for exerting a predetermined pressure on the fluid are contemplated, such as (without limitation) through the use of a slidable piston, a spring, pressurized gas, or pressurized fluid for exerting the necessary force upon the fluid within the first portion 30 of the conduit 18.

In accordance with this invention, there is also provided a signal means which is responsive to the fluid condition responsive member in the leak detector and which indicates when a predetermined fluid condition within the first portion 30 of the conduit 18 exists. A suitable signal means is illustrated in FIG. 2 and includes a conventional spring loaded normally open switch 60 and a switch activating rod 62, the rod being connected to the diaphragm 58 for movement therewith. When the fluid level within the accumulator 56 drops to a predetermined position, the activator rod 62 effects a change of state of the switch 60. Any type of signal can be employed to indicate the existence of the predetermined fluid condition. In the schematic electrical circuit 64 shown in FIG. 2, an audible signal or alarm 66 is shown in circuit with the switch 60 and a power source 68, so that upon closure of the switch 60 by the switch activating rod 62, the alarm 66 is energized.

In operation, when the pump 16 is activated by closure of the pump control switch 26 and the dispenser nozzle valve 24 is opened in order to dispense fluid, such as gasoline, the pressure differential across the check valve 28 effects opening of the valve to permit the gasoline to flow through the conduit 18. The diaphragm 42 within the chamber 50 of the valve seating means experiences the same pressure differential as does the check valve 28 by virtue of the tubes 48 and 54, thereby causing the diaphragm 42 and, hence, the rod 44 to move in a direction to facilitate opening of the check valve 28. If the fluid level within the accumulator 56 is below its design level, fluid will enter the accumulator during this fluid dispensing operation until the fluid is at its design level.

Upon closure of the dispensing nozzle valve 24 and deactivation of the pump 16, the check valve 28 closes in a conventional manner such as by reason of the force of a check valve spring 70. To be sure that the check valve is properly seated, the weighted diaphragm 58 exerts a desired pressure upon the fluid within the first section 30 of the conduit 18 and, by virtue of the tube 48, the same pressure is provided within the first section 50 of the chamber 40. The pressure within the second section 52 of the chamber 40 is equal to that of the pressure within the second portion 32 of the conduit 18 by virtue of tube 54, which pressure is less than that applied by the diaphragm 58 and, for example, usually is atmospheric when the pump 16 is not operating. The pressure differential across the diaphragm 42 causes the diaphragm to deflect downwardly, thereby moving the rod 44 downwardly and applying a valve seating force on the check valve 28. Because the rod 44 is directly attached to the check valve 28, the majority of the movement of the rod 44 is caused by the spring closing the check valve and only the small additional movement of the rod 44 to effect tight sealing of the check valve is a result of the pressure applied by the diaphragm 58, thereby requiring very little movement of the diaphragm 58 and very little loss of fluid from the accumulator 56. Since the extent of movement of the rod 44 and the diaphragm 58 to effect sealing of the valve 28 is consistent from time to time, the movement of the diaphragm 58 and switch activator rod 62 for valve sealing purposes is easily calibrated.

Because the valve 28 is closed and the dispensing nozzle valve 24 is closed, any further loss of fluid from the accumulator 56 is a result of a leak in the system and must be detected. Therefore, movement of the switch activator rod 62 an amount greater than necessary to effect sealing of the check valve 28 or greater than a tolerable leakage amount would cause switch 60 to close and set off the alarm 66.

SECOND EMBODIMENT (FIGS. 3–5)

Figure 3:
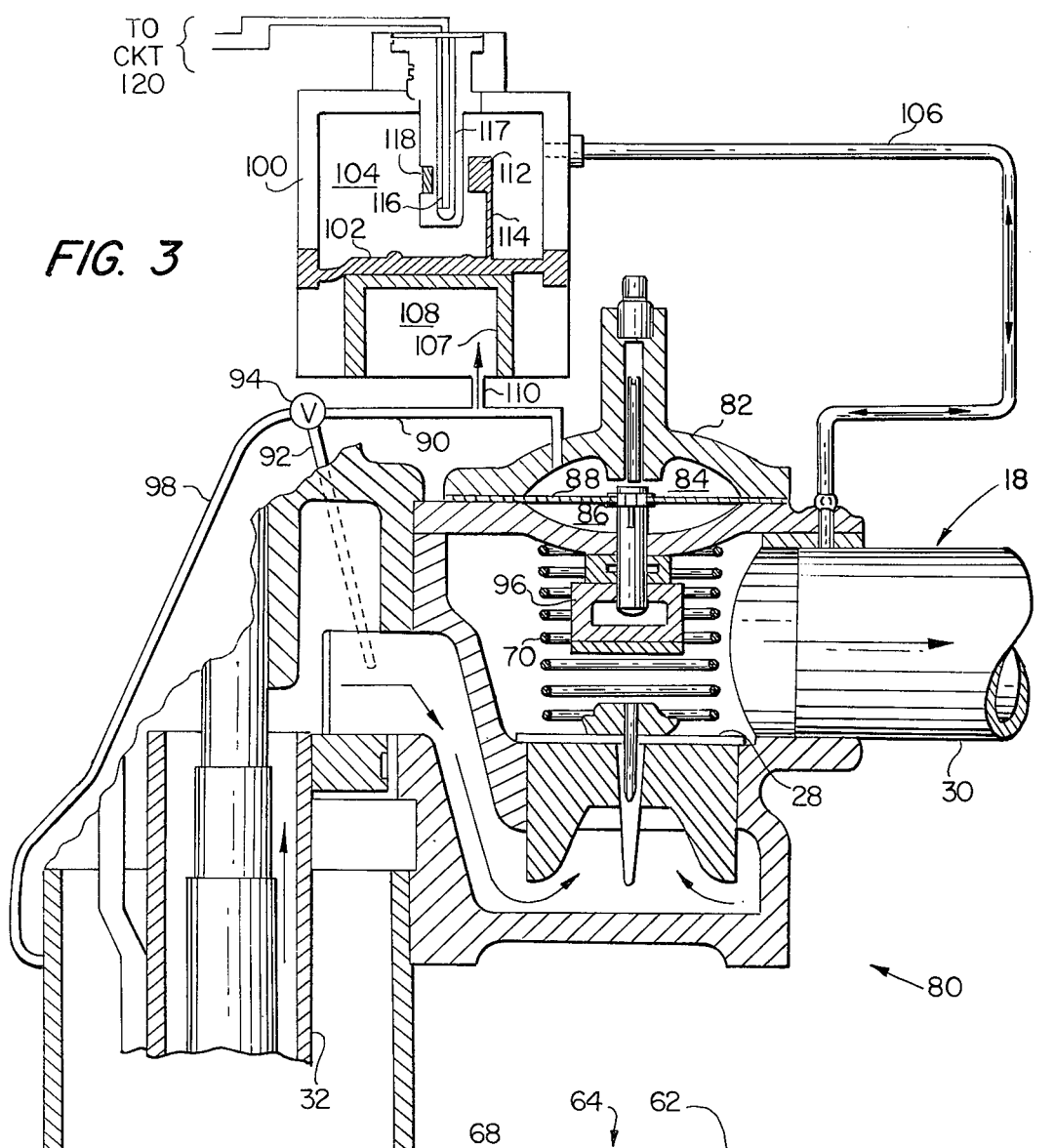
FIG. 3 is a sectional elevational view of a leak detection system formed in accordance with the second embodiment of this invention.

In accordance with the second embodiment of this invention, generally indicated 80 in FIG. 3, there is provided a valve seating means including a chamber and a pressure responsive member to facilitate clampdown or seating of the check valve 28. As embodied in this second embodiment, there is shown a chamber 82 divided into a first section 84 and a second section 86 by a flexible diaphragm 88. The first section 84 is placed in selective fluid flow communication with the second portion 32 of the conduit 18 and, therefore, the high pressure side of the pump 16, by means of tubes 90, 92 and a solenoid operated control valve 94. The first section 84 may also be placed in fluid flow communication with the low pressure side of the pump 16 for venting purposes by means of a bleed line or tube 98 and the control valve 94. The second section 86 of the chamber 82 is maintained at relatively low pressure either by being vented to a relatively low pressure source such as the low pressure side of the pump or by being sealed with low pressure in the section, such as atmospheric pressure.

A plunger 96 is directly connected to the diaphragm 88 to clamp down or seat the check valve 28 when the pressure in the first section 84 of the chamber 82 substantially exceeds the pressure within the second section 86 of the chamber 82. In this second embodiment the plunger 96 is not attached directly to the check valve 28, although such connection could be made as is shown in the first embodiment illustrated in FIG. 2.

The system 80 of this second embodiment also includes a leak detector having a member responsive to a fluid flow condition within the first portion 30 of the conduit 18. As embodied herein, the leak detector includes an enclosure 100 having a flexible diaphragm 102 defining a first section 104 of the enclosure which is in fluid flow communication with the first portion 30 of the conduit 18 by virtue of a tube 106. A cup shaped member 107 attached to the diaphragm 102 together with the diaphragm defines a second section 108. The second section 108 is placed in fluid flow communication with the high pressure side of the pump 16 by means of a tube 110, which is connected to the aforementioned tube 90.

In accordance with this invention, a signal means is provided which is operated by the member which is responsive to the fluid condition within the first portion of the conduit. As embodied herein, the signal means includes a magnet 112 carried by the diaphragm 102 by means of a support 114. A reed relay 116 extends into the first section 104 of the enclosure 100 within a protective envelope 117 and a second magnet 118 is fixedly mounted within the first section 104 in alignment with the reed relay 116. When the fluid condition responsive member, such as diaphragm 102, is in a normal position as illustrated in FIG. 3, the magnet 112, which is responsive to the position of the diaphragm, and the fixed magnet 118 are in direct alignment with the reed relay 116. The magnet 118 tends to close the reed relay 116, however, the magnet 112, being stronger than the magnet 118, maintains the reed relay open as long as it is in alignment with the reed relay and stationary magnet 118.

Figure 4:
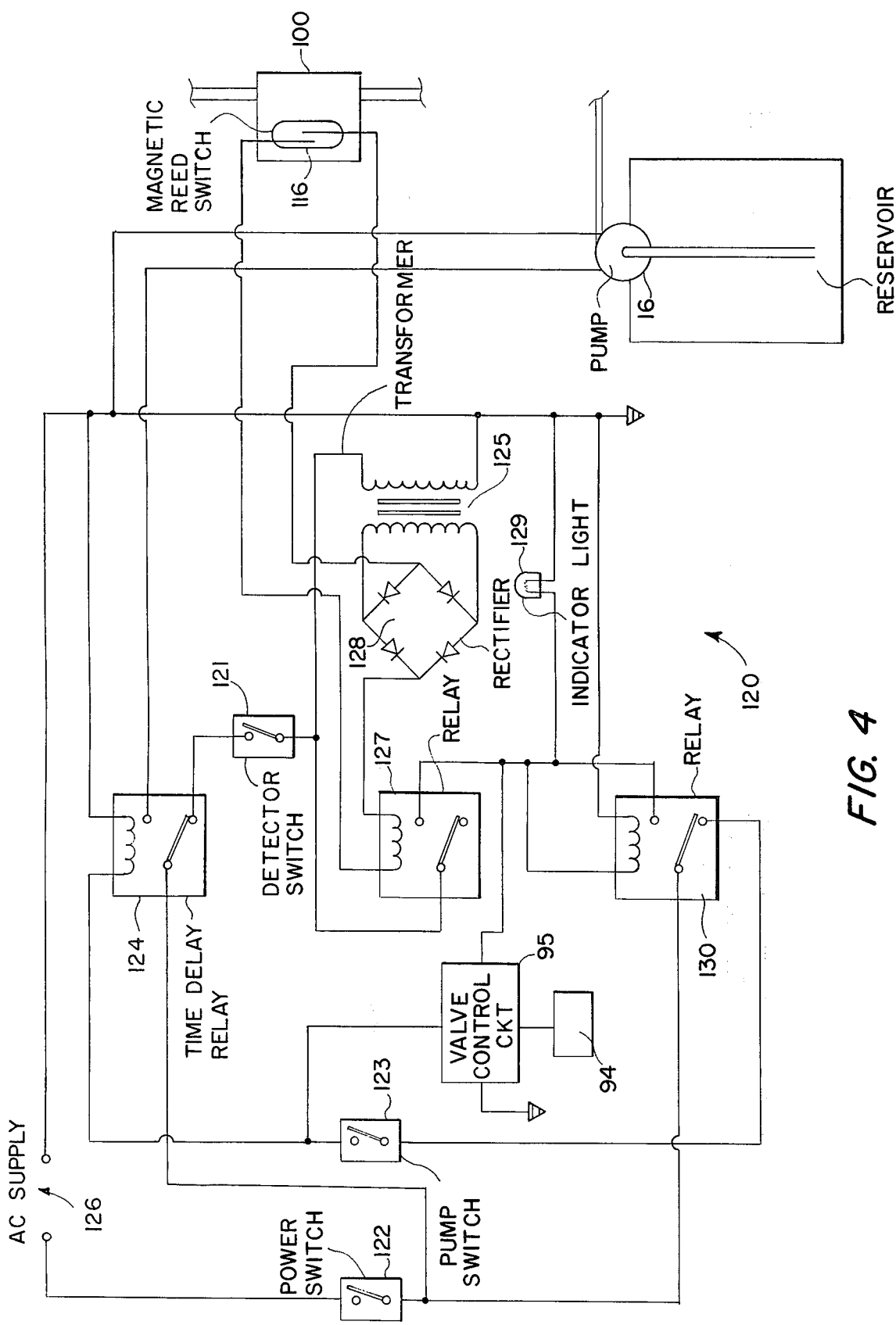
FIG. 4 is a schematic circuit diagram of a control circuit which may be used with the second embodiment shown in FIG. 3.

While many types of control circuits may be utilized in the leak detection system of this invention in order to control the operation of the pump and signal the existence of a leak, one particular circuit 120 which provides the control desired is illustrated in FIG. 4. When it is desired to test for leaks, a leak detection switch 121 is closed. In order to dispense a fluid, such as gasoline, a primary power switch 122 is closed followed by the closing of a pump switch 123. The closing of the pump switch 123 activates a time-delay-on-deactivation relay 124 resulting in operation of the pump 16.

When the nozzle valve 24 is opened the first portion 30 of the conduit 18 is at atmospheric pressure and the pressure differential across the check valve 28 produced by the pump 16 causes the check valve 28 to open permitting fluid to flow from the pump 16 through the conduit 18 and out through the dispenser nozzle valve 24. When the dispenser nozzle valve 24 is closed, the pressures within the first and second sections 30, 32, respectively, of the conduit 18 are equal and the check valve spring 70 effects closure of the check valve 28. Through the control circuit 120 closing the dispenser nozzle valve 24 and opening the pump switch 123 effects movement of the control valve 94 so that the first section 84 of the chamber 82 and the second section 108 of the enclosure 100 are placed in fluid flow communication with the second portion 32 of the conduit 18 or, in other words, with the high pressure side of the pump 16. Closing the dispenser nozzle valve 24 does not effect deactivation of the pump because the relay 124 provides a time delay on deactivation (approximately 30 seconds). Therefore the pump still applies pressure on the fluid in the second portion 32 of the conduit and, consequently, in the first section 84 of the chamber 82 and the second section 108 of the enclosure 100.

The pressure in the first section 84 of the chamber 82 is greater than the pressure in the second section 86, causing the diaphragm to flex in a direction to force the plunger 96 toward the check valve 28 to ensure proper sealing of the check valve.

With respect to the leak detector, the pressure in the second section 108 of the enclosure 100, unless counteracted, would tend to move the diaphragm 102 so that the magnet 112 moves away from the reed relay 116 (upwardly as shown in FIG. 3). However, the first section 104 of the enclosure 100 is in fluid flow communication with the first portion 30 of the conduit 18, the pressure of which is substantially equal to the output pressure of the pump 16. Therefore, if there is no leak in the first portion 30 of the conduit 18, the diaphragm 102 will not move sufficiently to remove magnet 112 from its zone of effectiveness with respect to the reed relay 116. Since the magnet 112 does not move, the reed switch 116 remains open and, after elapse of the predetermined time period, the time delay relay 124 opens and the pump 16 is deactivated. Also, the control valve 94 is returned to its normal position such as by means of a spring (not shown) in which the first section 84 of the chamber 82 and the second section 108 of the enclosure 100 are bled to the low pressure side of the pump or to the atmosphere through bleed line 98. Bleeding the first section 84 of the chamber 82 before the pump is reactivated for a next pumping operation prevents interference with the opening of the check valve 28.

However, if a leak exists in the first section 30 of the conduit 14 and fluid escapes therefrom the pressure in the second section 108 of the enclosure 100 will force the diaphragm 102 upwardly at a rate dependent upon the extent of leakage in the first section of conduit. When the magnet 112 is displaced sufficiently from the reed relay 116 so as to no longer be able to counteract the reed relay closing effect of the stationary magnet 118, the relay 116 closes. If the reed relay 116 is closed after the predetermined period of time after the pump switch 123 is opened (when the time delay relay 124 changes state to deactivate the pump 16) there exists a leak of sufficient intensity as to warrant setting off an alarm and blocking reactivation of the pump without intentional manual resetting of the system 80.

This is accomplished by the control circuit 120 which includes a transformer 125 the primary of which is energized by the main power source 126 through the main power switch 122, detector switch 121 and relay 124. When dispensing of the fluid is completed and the pump switch 123 is opened, the time-delay relay 124 opens after the predetermined interval energizing the primary of the transformer 125. If the magnetic reed switch 116 closes after the relay 124 opens, indicating the existence of a leak, a relay 127, powered by the secondary of the transformer 125 through a rectifier 128, closes placing a signal indicating means, such as an indicator light or alarm 129 in series with the energized transformer 125.

The closing of the magnetic reed switch 116 also energizes a second relay 130 which effects breaking the main power circuit to the pump 16 preventing the pump from being started even if the pump switch 123 is closed. The last two mentioned relays (127, 130) serve as a holding circuit to maintain the alarm 129 in the activated position and to prevent operation of the pump until the main power switch 122 is manually operated.

A valve contol circuit 95 for controlling operation of the control valve 94 is connected in the holding circuit and in circuit with the pump switch 123 so that when the pump switch is opened the control valve 94 is positioned to interconnect the first section 84 of the chamber 82 and the second section 108 of the enclosure 100 with the high pressure side of the pump as described above. If a leak exists in the first portion 30 of the conduit 18 and the signaling means are activated, the holding circuit prevents the control valve 94 from returning to the position which allows bleeding of the pressure from the second section 108 of the enclosure 100. While many types of valve control circuits may be used, one suitable circuit is a capacitive-circuit having a suitable time constant which is charged when the pump switch 123 is closed and which discharges through a solenoid coil of the valve 94 when the pump switch is opened.

FIG. 5 is an operational sequence diagram illustrating the operation of the system 80.

While one particular form of signal means is illustrated in FIG. 3, namely, the magnetically controlled reed relay 116, other suitable means may be used. For example, in place of the reed relay and magnet, a photocell and light source may be aligned above the diaphragm 102 and an opaque member connected to the diaphragm may be normally located below the photocell but oriented between them. Upward movement of the diaphragm will cause the opaque member to pass between the photocell and light source, resulting in the actuation of the signaling circuit.

THIRD EMBODIMENT (FIG. 6)

Figure 6:
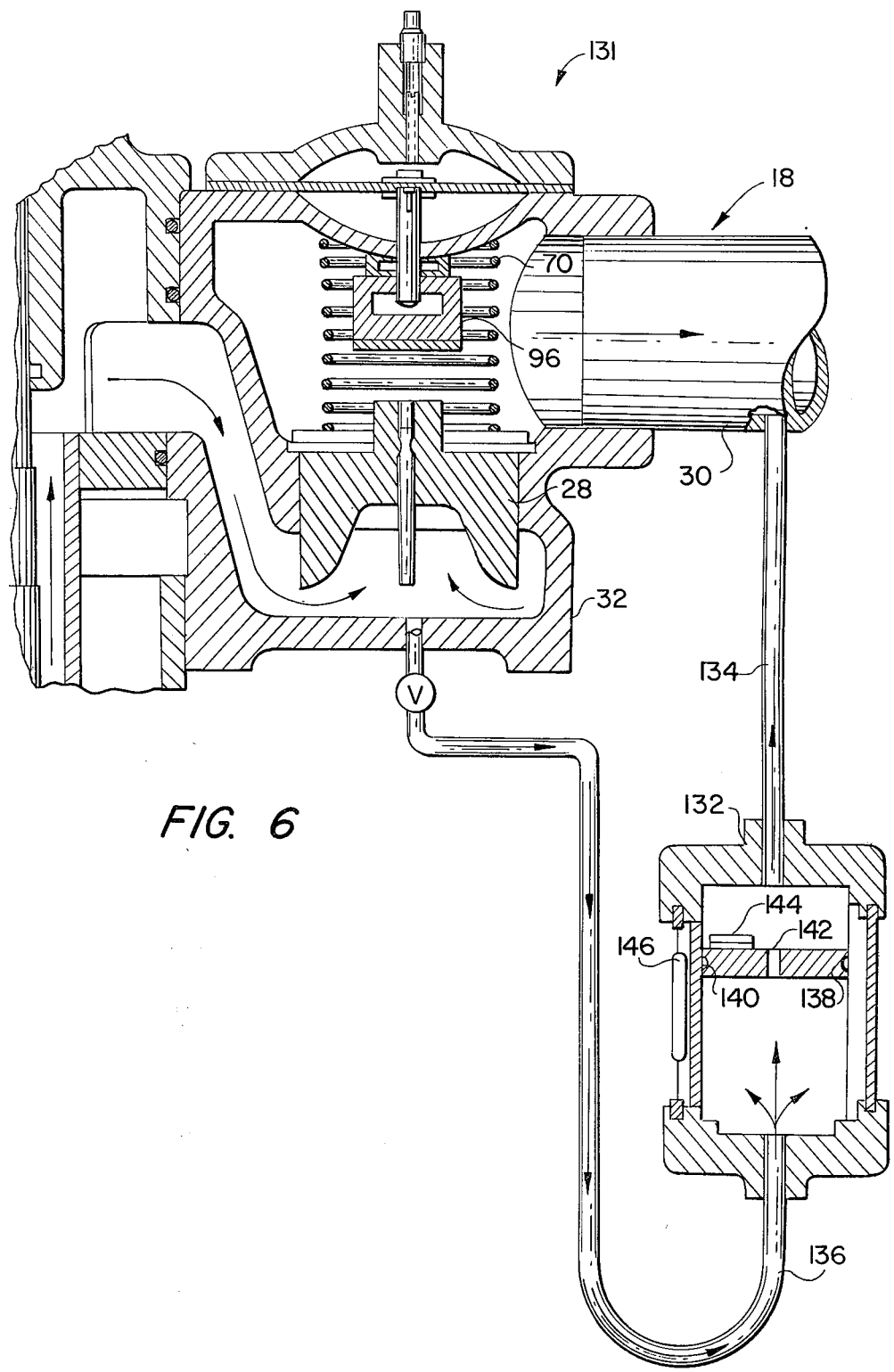
FIG. 6 is a sectional elevational view of a leak detection system formed in accordance with a third embodiment of this invention.

Turning now to FIG. 6, there is illustrated a leak detection system 131 formed in accordance with a third embodiment of this invention. The system employs a check valve seating means which may be of the type described above with respect to the second embodiment and illustrated in FIG. 3. This system 131 also includes a leak detector placed in fluid flow communication with the first portion 30 of the conduit 18 and including an enclosure and a member within the enclosure responsive to the fluid condition within the enclosure. As embodied herein a cylinder 132 is connected to the conduit 18 in parallel with the check valve 28. This is accomplished by connecting one end of the cylinder 132 to the first portion 30 of the conduit 18 by means of a tube 134 and by connecting the other end of the cylinder 132 to the second portion 32 of the conduit 18 by means of a tube 136. A weighted piston 138 is placed in the cylinder 132 for reciprocating motion therein, the piston being sealed to the walls of the cylinder by any conventional means such as an "O" ring 140. A small orifice 142 extends axially through the piston 138 to permit a controlled flow of fluid therethrough.

The system further includes signal means responsive to the fluid condition responsive member. One form of such signal means is a magnet 144 mounted on the piston 138 and a reed relay 146 mounted on the outside of the cylinder 132, the reed relay being designed to be closed when the magnet is higher than a set position near the bottom of the cylinder. The reed relay 146 is placed in a suitable pump control and alarm circuit, such as circuit 120 shown in FIG. 4, and described above.

In operation, when the fluid is to be dispensed, the pump 16 is activated and the dispenser nozzle valve 24 is opened, thereby permitting fluid to flow through the check valve 28 and out through the dispenser nozzle valve 24. During such dispensing of the fluid, fluid also flows through the tube 136, into the bottom of the cylinder 132, through the orifice 142 in the piston 138 and out through the tube 134 into first portion 30 of the conduit 18. The weight of the piston 138 and size of the orifice 142 are controlled so that the flow of fluid through the cylinder 132 causes the piston to rise to a particular desired height within the cylinder effecting closing the reed relay 146. It has been found that in a conventional gasoline distribution system, a ⅝ inch diameter piston, weighing 35.4 grams, and having a 3.5 mm. diameter orifice therethrough is suitable.

When the dispenser nozzle valve 24 is closed and fluid dispensing is terminated, the time delay relay 124 of control circuit 120 continues to effect actuation of the pump 16 for a predetermined time interval. During this period if no leakage occurs in the first portion 30 of the conduit 18, the pressure in the first portion 30 is substantially equal to the pressure in the second portion 32 of the conduit and the check valve spring 70 effects closure of the check valve 28. Furthermore, flow through the cylinder 132 is terminated and, since the pressure on opposite sides of the piston 138 is equal, the piston 138 floats downwardly toward the bottom of the cylinder 132. When the piston drops below the set position near the bottom of the cylinder, the reed relay 146 opens thereby opening the alarm circuit. Because all conditions within the system are substantially constant for a no-leak situation, the piston will reach the set position within the predetermined time interval set to turn off the pump 16. As long as the reed relay 146 opens prior to termination of the predetermined time interval, the alarm 129 is not set off and the pump is deactivated.

If a leak is present in the first portion 30 of the conduit 18, a pressure drop will exist across the piston 138 and, since the pump 16 is still operating, flow will exist in the cylinder 132 in a direction tending to prevent the piston 138 from floating downwardly. Consequently, the piston 138 will not be able to reach the bottom of the cylinder 132 and allow the reed relay 146 to open within the predetermined time interval. Upon expiration of this time interval the transformer 125 is energized and if the reed relay is closed, the alarm 129 will be set off, and the pump will be deactivated and will not be able to be reactivated until the pump switch is manually reset, all as described above with respect to the second embodiment.

It can be seen from the above that this invention comprises a leak detection system which is relatively inexpensive to manufacture, which is easy to install, and which effectively senses any leakage in a discharge line of a fluid dispensing system.

What is claimed as new and desired to be secured by Letters Patent of the United States is:

1. A leak detection system for use with a fluid pump, a dispenser, a dispenser valve for controlling fluid flow through said dispenser, a conduit connecting said pump and dispenser, pump control means for activating and initiating deactivation of said pump, and a second valve in said conduit to isolate said pump from said dispenser when a fluid is not being dispensed, said system comprising first means for enabling operation of said pump while said dispenser valve is closed by delaying deactivation of said pump for a finite predetermined period of time after said pump control means is operated to initiate deactivation of said pump, second means for ensuring leak free closure of said second valve when said dispenser valve is closed, and a leak detector including a member in fluid flow communication with said pump and with a portion of said conduit between said second valve and said dispenser, said member being responsive to a differential fluid condition between said second conduit portion and said pump, and signal means responsive to said member to indicate the existence of a predetermined differential fluid condition when said pump is operating and said dispenser valve is closed.

2. A leak detection system as defined in claim 1 including control means preventing reactivation of said pump upon the existence of said predetermined fluid condition.

3. A leak detection system for use with a fluid pump, pump control means for activating and initiating deactivation of said pump, a dispenser, a conduit connecting said pump and dispenser, and a valve in a first portion of said conduit to isolate said pump from said dispenser when a fluid is not being dispensed, said first portion being between said pump and dispenser, said system comprising:
   a. valve seating means, including
      i. a chamber having a pressure responsive first member mounted therein;
      ii. means operated by said first member adapted to forceably seal said valve in response to a predetermined pressure condition in said chamber to ensure no fluid flow past said valve during testing for leakage;
   b. a leak detector including means for delaying deactivation of said pump for a finite predetermined period of time after said pump control means is operated to initiate deactivation of said pump, an enclosure in fluid flow communication with a second portion of said conduit, said second portion being between said valve and said dispenser, and a second member responsive to a fluid condition within said enclosure, said fluid condition within said enclosure being a function of the fluid condition in said second portion of said conduit during said predetermined period of time, and
   c. signal means responsive to said second member to indicate when a predetermined fluid condition in said second portion of said conduit exists.

4. A leak detection system as defined in claim 3 wherein said means operated by said pressure responsive first member is connected directly to said valve.

5. A leak detection system as defined in claim 3 wherein said second member is fluid volume responsive.

6. A leak detection system as defined in claim 3 wherein said predetermined fluid condition in said second portion of said conduit is fluid flow when a fluid is not being dispensed through said dispenser.

7. A leak detection system as defined in claim 3 wherein said predetermined fluid condition in said second portion of said conduit is the flow of a predetermined quantity of fluid in a second predetermined time period when a fluid is not being dispensed through said dispenser.

8. A leak detection system as defined in claim 3 wherein said second member is responsive to the quantity of fluid in said enclosure and includes a signal activating means to effect changing the state of said signal means upon a predetermined change in fluid quantity in said enclosure.

9. A leak detection system as defined in claim 3 wherein said first member is a diaphragm, said diaphragm being mounted within said chamber so as to divide said chamber into first and second sections, said first section being in fluid flow communication with said second portion of said conduit.

10. A leak detection system as defined in claim 3 wherein said leak detector includes means for exerting a predetermined pressure on the fluid in said second portion of said conduit.

11. A leak detection system as defined in claim 10 wherein the pressure exerted by said leak detector effects movement of said first member to effect seating of said valve when said dispenser is closed and said pump is not activated.

12. A leak detection system as defined in claim 3 wherein said second member is responsive to the quantity of fluid in said enclosure and includes a signal activating means to effect change of state of said signal means upon a predetermined change in fluid quantity in said enclosure within a predetermined period after said dispenser is closed.

13. A leak detection system as defined in claim 3 wherein said first member divides said chamber into first and second sections, and including a duct connecting said first section with a third portion of said conduit, said third portion being between said pump and said valve, a second valve in said duct and responsive to the closing of said dispenser such that when a fluid is being dispensed the second valve prevents the flow of fluid from said pump to said first section and when the dispensing of fluid is terminated, the second valve permits flow of fluid from said pump to said first section.

14. A leak detection system as defined in claim 13, wherein said pump control means is responsive to said dispenser, said control means effecting:
   a. activation of said pump upon the turning on of said dispenser;
   b. opening of said second valve upon the turning off of said dispenser to permit fluid flow to said first section from said pump; and
   c. closing of said second valve and deactivation of said pump a predetermined period of time after said dispenser is turned off.

15. A leak detection system as defined in claim 14, including second control means responsive to the fluid condition within said second portion of said conduit, said second control means preventing reactivation of said pump upon the existence of said predetermined fluid condition in said second portion of said conduit.

16. A leak detection system as defined in claim 14 wherein said second member divides said enclosure into third and fourth sections, said third section being in flow communication with said conduit second portion, said fourth section being in flow communication with said duct, said second member being responsive to a pressure differential across said second member and wherein the opening of said second valve permits fluid flow to said fourth section.

17. A leak detection system as defined in claim 16, including signal activating means to effect change of state of said signal means upon movement of said second member said predetermined degree within said predetermined time.

18. A leak detection system as defined in claim 3, wherein said second member divides said enclosure into first and second sections, said enclosure first section being in flow communication with said conduit second portion, said enclosure second section being in flow communication with said conduit third portion, said third portion being between said pump and said valve, said second member being responsive to a pressure differential across said second member.

19. A leak detection system as defined in claim 18, including signal activating means to effect change of state of said signal means upon a predetermined degree of movement of said second member within a second predetermined period of time after the dispenser is turned off.

20. A leak detection system as defined in claim 19, wherein said pump control means is responsive to said dispenser, said control means effecting:
   a. activation of said pump upon the turning on of said dispenser; and
   b. deactivation of said pump after closing the dispenser and less than said second predetermined time after the dispenser is closed.

21. A leak detection system as defined in claim 20 including second control means preventing reactivation of said pump upon the existence of said predetermined fluid condition.

22. A leak detection system for use with a fluid pump, a dispenser, and a conduit connecting said dispenser and pump, said system including:
   a. a valve in said conduit to isolate said pump from said dispenser when a fluid is not being dispensed;
   b. valve seating means including
      i. a chamber having a diaphragm mounted therein and dividing said chamber into first and second sections, said first section being in fluid flow communication with a first portion of said conduit, said first portion being between said valve and said dispenser, said second section being in fluid flow communication with a second portion of said conduit, said second portion being between said valve and said pump;
      ii. means responsive to movement of said diaphragm to forceably seat said valve in response to a predetermined pressure differential across said valve to ensure no fluid flow past said valve during testing for leakage;
   c. a leak detector including an accumulator in fluid flow communication with said first portion of said conduit and first means for exerting a predetermined pressure on the fluid in said accumulator, said first portion and in said first section of said chamber when said dispenser is closed;
   d. signal means; and
   e. signal activating means responsive to the fluid volume in said accumulator, said signal activating means effecting a change of state of said signal means upon occurrence of a predetermined change in fluid volume in said accumulator after closure of said dispenser.

23. A method of detecting leaks in a system having a fluid pump, a dispenser, a conduit connecting said pump and dispenser and a valve in said conduit, comprising the steps of:
   a. activating the pump and opening the dispenser to dispense fluid;
   b. closing the dispenser and maintaining activation of the pump;
   c. closing the valve to isolate the pump from the dispenser;
   d. sensing a flow of fluid in the portion of the conduit between the valve and dispenser; and
   e. deactivating the pump after a predetermined time period after closing the dispenser.

24. A method as defined in claim 23 including the steps of energizing signaling means and preventing reactivation of the pump when said flow of fluid is greater than said predetermined amount within said predetermined time period and said dispenser is closed.

25. A method as defined in claim 23 including the step of applying fluid pressure to said valve to ensure closure of said valve after the dispenser is closed.

26. A method of detecting leaks in a system having a fluid pump, a dispenser, a conduit connecting said pump and dispenser and a valve in said conduit comprising the steps of:
  a. activating the pump and opening the dispenser to dispense fluid;
  b. closing the dispenser;
  c. applying a force on said valve from an energy soorce external to said valve to forceably seal the valve;
  d. applying a predetermined pressure on the fluid in the portion of the conduit between the valve and dispenser within a predetermined period of time after the dispenser is closed;
  e. sensing a flow of fluid in said portion of the conduit; and
  f. energizing signal means if said flow of fluid is greater than a predetermined amount.

* * * * *